Patented Feb. 25, 1947

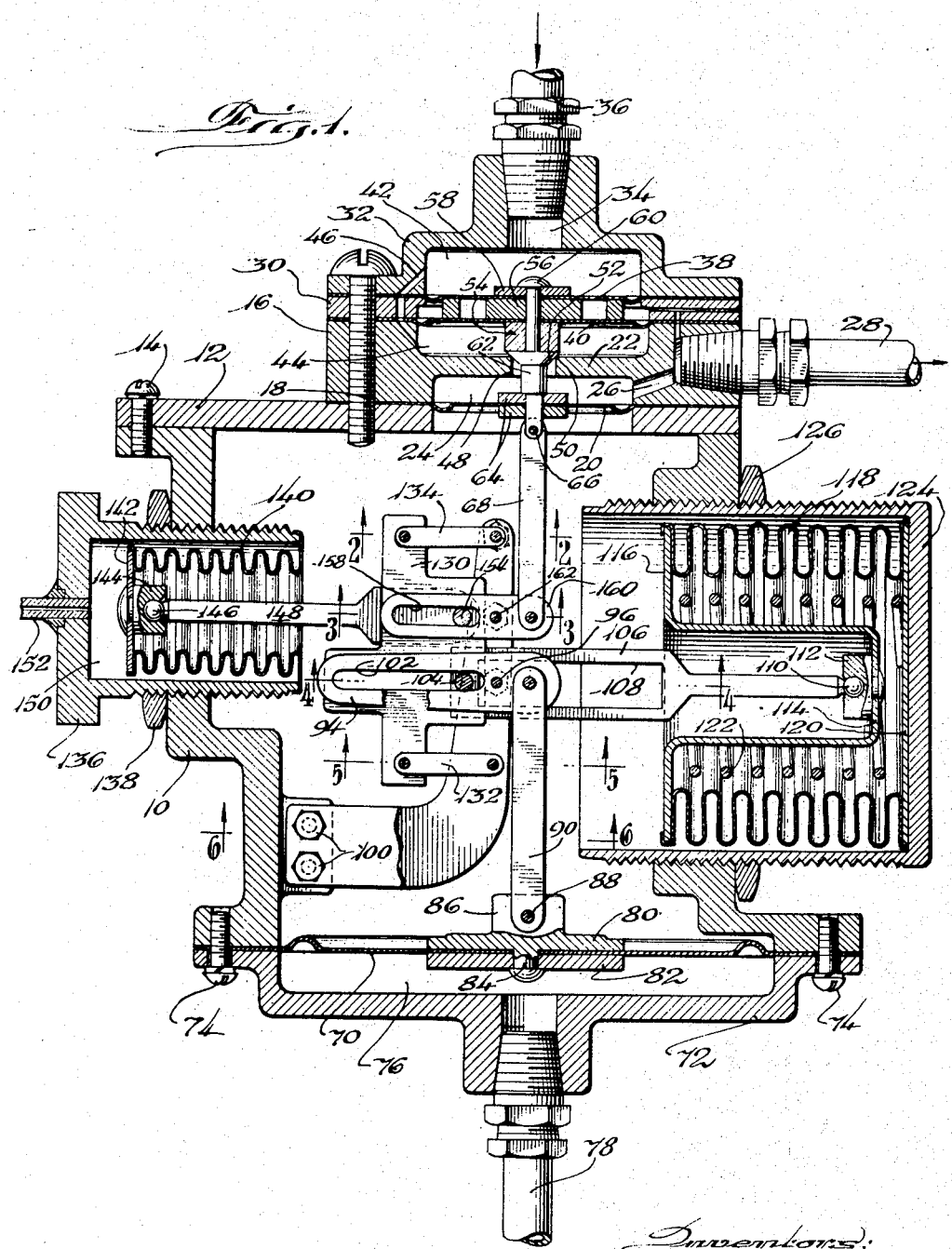

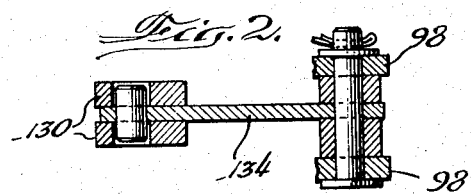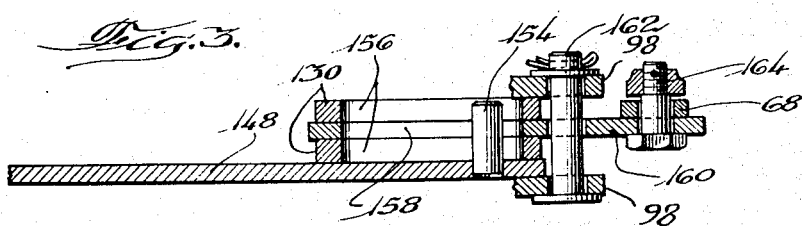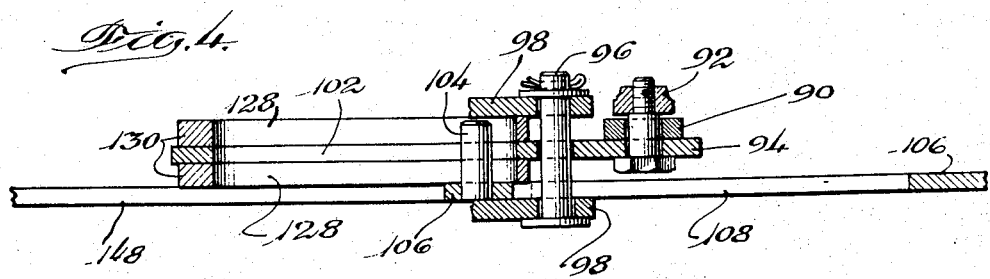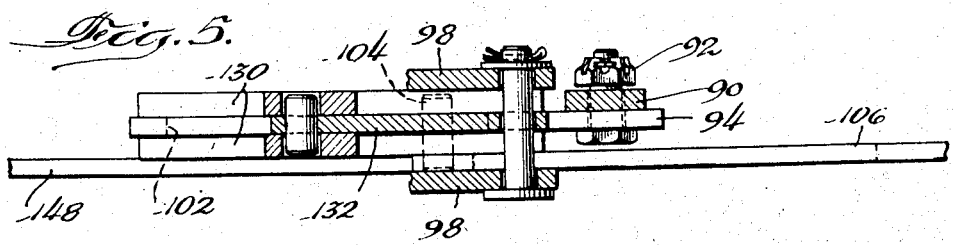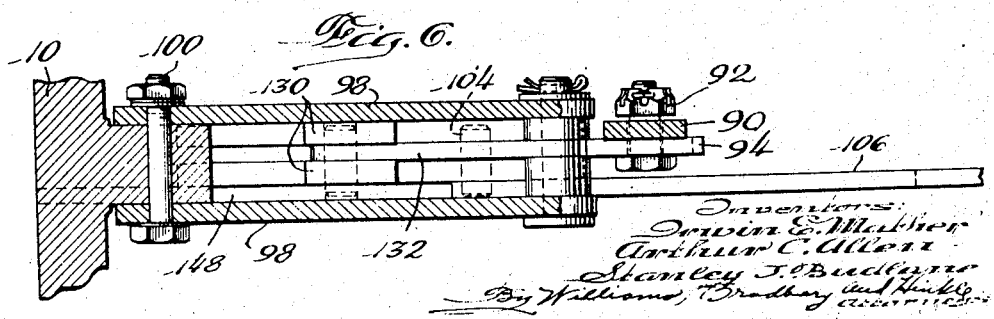

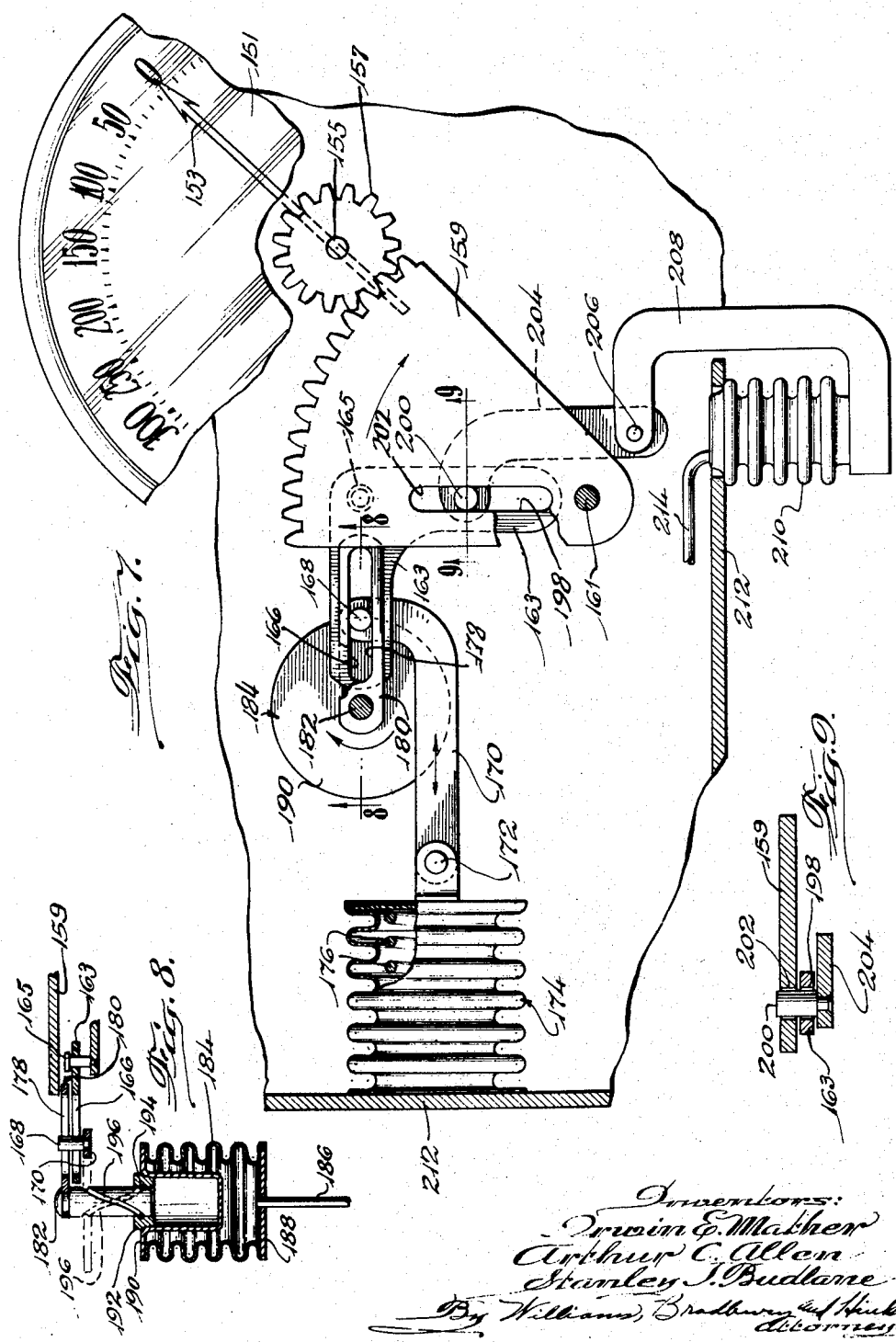

2,416,453

UNITED STATES PATENT OFFICE 2,416,453

RATE CHANGING MECHANISM

Irwin E. Mather and Arthur C. Allen, Chicago, and Stanley J. Budlane, Moline, Ill., assignors to Stewart-Warner Corporation, Chicago, Ill., a corporation of Virginia Application December 27, 1943, Serial No. 515,714

9 Claims. (Cl. 236—92)

Our invention relates to rate changing mechanism and is particularly adapted for, but not limited to, use in connection with aircraft instruments and other devices used in and about an aircraft.

In aircraft operation it is usual to provide the aircraft with instruments which must be compensated for variations in several characteristics such as temperature and barometric pressure which vary rapidly with changes in altitude. It is also necessary to provide fuel control devices with altitude and temperature compensating means in order that the fuel supplied to an engine, internal combustion heater, or other fuel compensating device will be properly proportioned to the combustion air for all variations in temperature and altitude.

An object of our invention is to provide a rate changing mechanism which can be utilized to modify the position of a fuel control valve or pointer to compensate for the effect of rapid changes in altitude and temperature.

Another object of our invention is to provide a rate changing mechanism which is capable of general application.

Another object of our invention is to provide a new and improved rate changing mechanism which is accurate, simple, light in weight, compact and inexpensive.

Another object of our invention is to provide a new and improved mixture control device.

Another object of our invention is to provide a new and improved air speed meter.

Other objects of our invention will become apparent as the description proceeds.

In the drawings:

Fig. 1 is a sectional view of a mixture control device embodying our invention;

Figs. 2, 3, 4, 5 and 6 are partial, horizontal sections taken respectively on the lines 2—2, 3—3, 4—4, 5—5 and 6—6 of Fig. 1;

Fig. 7 is a somewhat diagrammatic representation of an air speed meter embodying our invention;

Fig. 8 is a detail of the air speed indicating bellows and is taken on the line 8—8 of Fig. 7; and Fig. 9 is a partial, sectional view taken on the line 9—9 of Fig. 7.

The mixture control device shown in Fig. 1 comprises a tubular body 10 closed at one end by a plate 12 secured to the body by screws 14. A casting 16 is attached to the plate 12 by screws 18 and a flexible diaphragm 20 is firmly clamped between the casting 16 and plate 12. The diaphragm 20 and partition 22 forming a part of the casting 16 cooperate to provide a chamber 24 communicating with a fuel outlet 26 leading to a pipe 28 which furnishes fuel to an internal combustion heater, internal combustion engine, or other fuel burning device.

The screws 18 also hold in place a ring 30 and a cap 32, the latter being provided with a fuel inlet 34 to which fuel is supplied by a pipe 36 leading from a fuel tank, or any other suitable source of fuel. A flexible diaphragm 38 is clamped between the cap 32 and ring 30 and a diaphragm 40 is clamped between this ring and the casting 16. A fuel inlet chamber 42 is formed between the cap 32 and upper diaphragm 38 and a valve chamber 44 is formed between the lower diaphragm 40 and partition 22. The chambers 42 and 44 are connected by a passage 46, so that fuel may freely flow past the diaphragms 38 and 40.

The partition 22 is provided with an opening 48 terminating in a valve seat 50 adapted to be engaged by a tapered surface 52 of a valve member 54. A disc 56 is located between the central portions of the diaphragms 38 and 40 and this disc, valve member 54 and washer 58 are attached to these diaphragms by a pin 60 whose upper end is riveted over the washer 58, as clearly shown in the drawing.

The fuel inlet chamber 42 has a slightly smaller diameter than the intermediate chamber 44 and this difference in diameter reflects the differences in effective areas of the diaphragms 38 and 40. The area of the diaphragm 40 is greater than the area of the diaphragm 38 by an amount equal to the area of the valve seat 50. By virtue of this construction, fluid in intermediate chamber 44 acts over the same area to raise the valve member 54, as does fluid in chamber 42, tending to seat this valve and the valve is, therefore, balanced with respect to fluid pressure in the chambers 42 and 44.

The valve member 54 has an extension 62 passing through the diaphragm 20 and extending through openings in a pair of washers 64 clamped on opposite sides of the central portion of this diaphragm. A pin 66 pivotally connects the extension 62 to the upper end of an operating link 68. In general, the operating link 68 and valve member 54 are controlled by a main diaphragm 70 clamped between the body 10 and a cover 72 attached to the other end of the body 10 by screws 74. An air pressure chamber 76 is provided between the diaphragm 70 and cover 72 and this chamber communicates with a combustion air ram by way of pipe 78, so that the pressure in the chamber 76 varies with the force available to supply combustion air to the internal combustion heater, engine or other fuel consuming apparatus. Since the mass of air supplied to such apparatus varies with the temperature of the air and the barometric pressure, we have provided means interposed between the diaphragm 70 and link 68 for changing the relationship between valve member 54 and diaphragm 70 in accordance with variations in temperature and barometric or atmospheric pressure.

Plates 80 and 82 are secured to the center of diaphragm 70 by a rivet-like extension 84 of the plate 80 which extends through diaphragm 70 and plate 82 and is riveted over, as clearly shown in the drawing. The plate 80 has a boss 86 pivotally connected by a pin 88 to a second operating link 90. Nut and bolt 92 pivotally connect the upper end of the link 90 with one end of a lever 94 fulcrumed about a pin 96 supported in brackets 98 attached to the body 10 by bolts 100. The other end of the lever 94 is provided with a slot 102 slidably receiving a pin 104 mounted in a slide 106. The slide 106 has a rectangular opening 108 through which the pin 96 passes. The length and width of this opening 108 are such that the slide 106 may shift the pin 104 lengthwise of the slot 102 and may also pivot to some extent about this pin without engaging the fixed pin 96.

The righthand end of slide 106 is of reduced cross section and terminates in a ball 110 universally movable in a socket 112 riveted to the inward extension 114 of a plate 116 attached to and closing one end of an evacuated bellows 118. The other end of the bellows 118 is sealed by a second plate 120 and a spring 122 confined between plates 116 and 120 tends to expand the bellows 118 against the resistance of atmospheric pressure acting over the area of the plate 116, it being understood that the interior of the tubular member 10 is open to atmospheric pressure. The bellows 118 constitutes an aneroid which shifts the slide 106 and pin 104 to different positions with variations in atmospheric pressure. This aneroid is located in a cup 124 threadedly attached to the tubular body 10 and located in place by a nut 126.

Pin 104 also extends through slots 128 formed in a pair of floating members 130 whose opposite ends are pivotally connected to brackets 98 by links 132 and 134. The vertical position of the floating members 130 is in general determined by the position of the diaphragm 70, but for any given position of this diaphragm, the vertical position of floating members 130 will vary with variations in atmospheric pressure through expansion and contraction of bellows 118. Such expansion and contraction produce a corresponding movement of the slide 106 which shifts pin 104 closer to or farther from the fixed pin 96 which forms the fulcrum for the lever 94. A drop in atmospheric pressure permits bellows 118 to expand, thereby moving pin 104 away from fulcrum pin 96 and increasing the movement of floating members 130 for a given movement of diaphragm 70. Conversely, an increase in atmospheric pressure will produce a contraction of bellows 118 and reduce the movement of floating members 130 in response to movements of the diaphragm 70.

A second cup 136 is threaded into the tubular body 10 and located in place by a nut 138. A bellows 140 has one end sealed to the open end of the cup 136 and the other end sealed to a plate 142 having a boss 144 forming a universal socket for a ball 146 formed at one end of a second slide 148. The cup 136 and bellows 140 form a fluid chamber 150 which communicates through a tube 152 with a bulb located on the wing of the aircraft, or in any other exposed position where it is subject to variations in atmospheric temperature. This bulb, the tube 152 and chamber 150 are filled with a fluid whose volume changes materially with temperature variations whereby increases in temperature move slide 148 to the right, as viewed in the drawings and decreases in temperature permit bellows 140 to expand and move this slide to the left.

As clearly shown in Figs. 1 and 3, the slide 148 carries a pin 154 located in slots 156 in floating members 130 and in a slot 158 of a lever 160 pivoted about a pin 162 mounted in the brackets 98. Nut and bolt 164 form a pivotal connection between the lever 160 and lower end of the valve operating link 68. The slide 148, therefore, controls the point of pivotal connection between the floating members 130 and the lever 160, so that an increase in temperature moves the pin 154 closer to the fulcrum 162 and increases the effect of movements of diaphragm 70 on the fuel control valve member 54, whereas a decrease in temperature decreases the effect of such diaphragm movements on the fuel control valve.

From the foregoing description of that form of our invention shown in Figs. 1 to 6, inclusive, it will be apparent that we have provided rate changing mechanism which modifies the effect of movements of the main diaphragm 70 on the fuel control valve to compensate for changes in atmospheric temperature and altitude. A decrease in temperature is accompanied by an increase in the density of the air at a given atmospheric pressure. The increased density of the air tends unduly to raise the main diaphragm 70 so that the temperature responsive slide 148 reduces the effect of diaphragm movements on the fuel valve with decreases in atmospheric temperature to compensate for the over lifting of the diaphragm 70 by the increased mass of the air entering the ram which is connected to the diaphragm chamber 76 by way of pipe 78.

On the other hand, a decrease in the atmospheric pressure tends unduly to lower the diaphragm 70 and to compensate for this the bellows 118 moves slide 106 to increase the effect of diaphragm movements on the fuel valve. By virtue of our novel rate changing mechanism a proper ratio of fuel to combustion air is maintained under all variations of temperature, altitude and speed.

In the embodiment of Figs. 7 to 9, inclusive, we have illustrated a modified form of our rate changing mechanism as being applied to an instrument for indicating the air speed of an aircraft. This air speed indicator is shown as comprising a stationary dial 151 which may be marked with suitable indicia representing different air speeds and a movable pointer 153 which is rotated over the dial 151 by a shaft 155 to which the pointer is attached. A gear 157 is secured to the shaft 155 and is driven by a segmental gear 159 rotatable about a fixed pivot 161.

A floating member 163 is pivotally mounted on a portion of the frame by means of a pin 165 and has a slot 166 receiving a pin 168 carried by an L-shaped link 170 pivotally attached at 172 to the movable end of an evacuated bellows 174 having a spring 176 tending to expand the bellows against the force of atmospheric pressure. The pin 168 also extends into the slot 178 of a driving arm 180 attached to a rotatable shaft 182.

The shaft 182 is rotated by an air speed responsive bellows 184 connected by a tube 186 to a Pitot tube (not shown) located on the wing or other exposed part of the aircraft so that the bellows 184 expands and contracts with changes in air speed of the aircraft. The end 188 of the bellows is fixed so that the plate 190 closing the opposite end of the bellows moves with expansions and contractions thereof. This plate carries a ring 192 having balls 194 located in sockets formed therein. These balls also have portions located in inclined cam grooves 196 formed in the shaft 182 which is to be held by any suitable means against longitudinal movement so that expansion and contraction of the bellows 184 shall cause rotation of the shaft 182 and arm 180 attached thereto.

The extent to which this rotation of arm 180 is transmitted to floating member 163 depends upon the position of the pin 168 in the slots 166 and 178. The position of this pin varies with atmospheric pressure which controls the expansion of the evacuated bellows 174. A decrease in atmospheric pressure results in expansion of the bellows 174 and movement of the pin 168 to the right, as viewed in Figs. 7 and 8, thereby increasing the effect on floating member 163 of movements of arm 180. An increase in atmospheric pressure produces a contraction of bellows 174 and a leftward movement of pin 168, which decreases the effect of speed changes on the position of the floating member 163.

Floating member 163 also has a second slot 198 arranged at right angles to the slot 166. A pin 200 is slidable lengthwise of the slot 198 and also of a corresponding slot 202 formed in the segmental gear 159. The pin 200 is mounted on the upper end of an L-shaped link 204 pivoted at 206 to one end of a U-shaped strap 208 attached to the free end of a bellows 210. The opposite end of the bellows 210 is attached to a fixed support 212 which may be part of the instrument housing and may constitute the same structural element which supports the lefthand end of the evacuated bellows 174.

The bellows 210 elongates and contracts with variations in temperature and is filled with an expansible fluid and connected by a tube 214 to a temperature bulb located on the wing or other exposed part of the aircraft. The temperature responsive bellows 210 controls the position of the pin 200 and thereby varies the pivotal relationship between the floating member 163 and segmental gear 159 to compensate for the effect of temperature variations.

From the foregoing description of that form of our invention embodied in Figs. 7, 8 and 9, it will be apparent that we have provided an air speed indicator which is compensated for the effects of variation in atmospheric temperature and pressure on the pressure produced by a Pitot tube and that this instrument will accurately reflect the true air speed for all conditions of atmospheric temperature and pressure. This embodiment of our invention, like the previous embodiment, drives through a floating member and means is provided to vary the rate at which this floating member is driven by the main actuating means. Likewise, provision is also made to vary the driving action of the floating member on the fuel valve indicator pointer or other driven element in accordance with variations in another modifying condition. Our novel rate changing mechanism effects the requisite compensations through simple and inexpensive structure which may be readily incorporated in a wide variety of devices.

While we have illustrated and described only two embodiments of our invention, it is understood that our invention may assume numerous other forms and includes all modifications, variations and equivalents coming within the scope of the appended claims.

We claim:

1. Rate changing mechanism of the class described, comprising a driving element, a floating member, slots provided by said element and member, a pin movable lengthwise of said slots to vary the driving relation between said element and member, means for shifting said pin lengthwise of said slots, a driven element, slots provided by said member and driven element, a pin movable lengthwise of said last-named slots to vary the driving relationship between said member and said driven element, said pins being independent of each other, and separate means for shifting said last-named pin.

2. Rate changing mechanism of the class described, comprising a driving element, a floating member, parallel slots provided by said member, a slot in said element, a pin movable lengthwise of said slots to vary the driving relation between said element and member, means for shifting said pin lengthwise of said slots, a driven element, slots provided by said member and driven element, a pin movable lengthwise of said last-named slots to vary the driving relationship between said member and said driven element, said pins being independent of each other, and separate means for shifting said last-named pin.

3. Rate changing mechanism of the class described, comprising a driving element, a floating member, a pair of pivots therefor, slots provided by said element and member, a pin movable lengthwise of said slots to vary the driving relation between said element and member, means for shifting said pin lengthwise of said slots, a driven element, slots provided by said member and driven element, a pin movable lengthwise of said last-named slots to vary the driving relationship between said member and said driven element, said pins being independent of each other, and separate means for shifting said last-named pin.

4. Rate changing mechanism of the class described, comprising a driving element, a floating member, slots provided by said element and member, a pin movable lengthwise of said slots to vary the driving relation between said element and member, pressure-responsive means for shifting said pin lengthwise of said slots, a driven element, slots provided by said member and driven element, a pin movable lengthwise of said last-named slots to vary the driving relationship between said member and said driven element, said pins being independent of each other, and separate means for shifting said last-named pin.

5. Rate changing mechanism of the class described, comprising a driving element, a floating member, slots provided by said element and member, a pin movable lengthwise of said slots to vary the driving relation between said element and member, means for shifting said pin lengthwise of said slots, a driven element, slots provided by said member and driven element, a pin movable lengthwise of said last-named slots to vary the driving relationship between said member and said driven element, and temperature-responsive means for shifting said last-named pin, said temperature responsive means being independent of said first named shifting means.

6. Rate changing mechanism of the class described, comprising a driving element, a floating member, slots provided by said element and member, a pin movable lengthwise of said slots to vary the driving relation between said element and member, atmospheric pressure responsive means for shifting said pin lengthwise of said slots, a driven element, slots provided by said member and driven element, a pin movable lengthwise of said last-named slots to vary the driving relationship between said member and said driven element, and atmospheric temperature responsive means for shifting said last-named pin.

7. Rate changing mechanism of the class described comprising in combination a driving element in the form of a lever adapted to swing about a horizontal axis and provided with a longitudinally extending slot therein, a plate opposite to said lever and movable vertically with respect thereto but held from angular movement and provided with a horizontal slot therein opposite to the slot in said lever, a horizontally disposed pin engaging said slots and movable toward and from the axis about which said lever is movable, means for controlling the position of said pin, a driven element in the form of a lever adapted to swing about a horizontal axis adjacent to said first-named lever and provided with a longitudinally extending slot therein, said plate being provided also with a second horizontal slot therein opposite to the slot in said second-named lever, a second horizontally positioned pin engaging said last-named slots and movable toward and from the axis about which said second lever is movable, and means for controlling the position of said second pin.

8. A device for regulating flow of fuel to a fuel consuming device comprising in combination a lever adapted to swing about a horizontal axis and provided with a longitudinally extending slot therein, a diaphragm connected with said lever for giving it vertical swinging movements, a plate opposite to said lever and provided with a horizontal slot therein opposite to the slot in said lever, supporting means for said plate permitting vertical movement of said plate with respect to said lever but preventing angular movement of said plate, a horizontally positioned pin engaging said slots and movable toward and from the axis about which said lever is movable, air pressure responsive means for moving said pin along said slots, a driven element in the form of a lever adapted to swing about a horizontal axis adjacent to said first-named lever and provided with a longitudinally extending slot therein, said plate being provided also with a second horizontal slot therein opposite to the slot in said second-named lever, a second horizontally positioned pin engaging said last-named slots and movable toward and from the axis about which said second lever is movable, temperature responsive means for moving said second pin along said last-named slots, and a fuel valve controlled by the movements of said second lever.

9. Rate changing mechanism of the class described, comprising in combination two brackets in spaced relation, a driving element in the form of a lever adapted to swing about a horizontal pivot pin mounted on said brackets and provided with a longitudinally extending slot therein, two plates between said brackets at opposite faces of said lever and provided with horizontal slots therein opposite to the slot in said lever, pivoted links connecting said plates with said brackets for holding the plates against angular movement while permitting the plates to move freely up and down, a horizontally disposed pin engaging said slots and movable toward and from the axis of the lever, air pressure responsive means for moving said pin along said slots, a driven element in the form of a lever mounted above said first-named lever between said plates so as to swing about a horizontal pivot pin carried by said brackets and provided with a longitudinally extending slot therein, said plates being provided also with horizontal slots therein opposite to the slot in said second-named lever, a second horizontally positioned pin engaging said last-named slots and movable toward and from the axis of said second lever, and temperature responsive means for moving said second pin along said last-named slots.

IRWIN E. MATHER.
ARTHUR C. ALLEN.
STANLEY J. BUDLANE.

REFERENCES CITED

The following references are of record in the file of this patent:

UNITED STATES PATENTS

| Number | Name | Date |
|---|---|---|
| 2,183,586 | Phillips et al. | Dec. 19, 1939 |
| 2,251,498 | Schwein | Aug. 5, 1941 |
| 2,062,110 | Swartout | Nov. 24, 1936 |
| 1,737,746 | Young | Dec. 3, 1929 |
| 2,278,682 | Wagner | Apr. 7, 1942 |
| 2,087,885 | Fleischel | July 27, 1937 |
| 2,190,506 | Wurr | Feb. 13, 1940 |
| 737,541 | Williams | Aug. 25, 1903 |
| 1,892,765 | Howard | Jan. 3, 1933 |
| 1,665,145 | Peltz | Apr. 3, 1928 |
| 1,684,500 | McKee | Sept. 18, 1928 |
| 1,707,340 | Young | Apr. 2, 1929 |
| 2,161,743 | Heinrich | June 6, 1939 |
| 893,176 | Levilly | July 14, 1908 |
| 1,913,684 | Purdy | June 13, 1933 |
| 2,185,578 | Beardsley et al. | Jan. 2, 1940 |

FOREIGN PATENTS

| Number | Country | Date |
|---|---|---|
| 337,136 | Italian | Feb. 27, 1936 |
| 808,165 | French | Nov. 6, 1936 |